(12) United States Patent
Azadeh et al.

(10) Patent No.: US 8,891,686 B2
(45) Date of Patent: Nov. 18, 2014

(54) DATA SIGNAL DETECTION IN OPTICAL AND/OR OPTOELECTRONIC RECEIVERS AND/OR TRANSCEIVERS

(75) Inventors: Mohammad Azadeh, Northridge, CA (US); Near Margalit, Westlake Village, CA (US)

(73) Assignee: Source Photonics, Inc., Chatsworth, CA (US)

( * ) Notice: Subject to any disclaimer, the term of this patent is extended or adjusted under 35 U.S.C. 154(b) by 448 days.

(21) Appl. No.: 13/282,372

(22) Filed: Oct. 26, 2011

(65) Prior Publication Data

US 2013/0108278 A1 May 2, 2013

(51) Int. Cl.
*H04L 25/06* (2006.01)
*H04B 10/69* (2013.01)

(52) U.S. Cl.
CPC ................................ *H04B 10/695* (2013.01)
USPC ........... 375/318; 375/295; 375/316; 375/317; 375/320; 375/342

(58) Field of Classification Search
CPC .... H04B 10/695; H04B 10/564; H04B 10/69; H04B 10/693; H04B 10/0771; H04B 10/272; H04B 10/40; H04B 10/6931; H04B 2210/074; H04B 3/32; H01S 5/0428; H03K 5/082; H03K 5/151; H04J 3/22
USPC ......... 375/295, 306, 316, 317, 318, 319–322, 375/342, 348, 350
See application file for complete search history.

(56) References Cited

U.S. PATENT DOCUMENTS

| | | | |
|---|---|---|---|
| 5,818,620 A * | 10/1998 | Akimoto et al. | 398/209 |
| 7,183,540 B2 | 2/2007 | Zhang et al. | |
| 7,565,127 B2 * | 7/2009 | Tokairin et al. | 455/296 |
| 7,653,158 B2 * | 1/2010 | Rawlins et al. | 375/345 |
| 7,777,546 B2 * | 8/2010 | Liu | 327/307 |
| 7,853,154 B2 * | 12/2010 | Ikram et al. | 398/192 |
| 2003/0206054 A1 * | 11/2003 | Jin et al. | 330/69 |
| 2004/0208508 A1 * | 10/2004 | Tanaka | 398/19 |
| 2007/0286611 A1 * | 12/2007 | Weber et al. | 398/202 |
| 2009/0196632 A1 * | 8/2009 | Zhang | 398/202 |
| 2009/0238582 A1 * | 9/2009 | Tsunoda et al. | 398/208 |
| 2010/0054758 A1 * | 3/2010 | Ereifej et al. | 398/202 |
| 2012/0070155 A1 * | 3/2012 | Wieland et al. | 398/140 |
| 2013/0279903 A1 * | 10/2013 | Brown et al. | 398/25 |
| 2014/0010556 A1 * | 1/2014 | Yoshima | 398/212 |

OTHER PUBLICATIONS

Gu, Wen; Project Report on WDM/TDM-PON; School of Electrical and Computer Engineering, University of Oklahoma—Tulsa; Created on May 7, 2007; http://tulsagrad.ou.edu/samuel_cheng/computer_network_2007/Wen%20Gu%20-%20Presentation%20on%20WDMTDM-PON.pdf.

* cited by examiner

*Primary Examiner* — Hirdepal Singh
(74) *Attorney, Agent, or Firm* — Andrew D. Fortney; Central California IP Group, P.C.

(57) ABSTRACT

Methods for detecting and/or indicating the presence of valid data and threshold setting and data detection circuitry are disclosed. The threshold setting and data detection circuitry and related methods may be useful for fast and accurate reception of optical signals. The detection circuit generally comprises (i) a first circuit configured to regulate or control a DC offset of a differential input signal, and (ii) a second circuit coupled to the first circuit, the second circuit configured to indicate the presence of a data signal at the differential input signal when a voltage difference between true and complementary nodes of the differential input signal is above a predetermined threshold.

20 Claims, 4 Drawing Sheets

DATA SIGNAL DETECTION IN OPTICAL AND/OR OPTOELECTRONIC RECEIVERS AND/OR TRANSCEIVERS

FIELD OF THE INVENTION

The present invention generally relates to optical signal reception. More specifically, embodiments of the present invention pertain to methods and apparatuses for detecting optical signals over an optical network using an optical and/or optoelectronic receiver and/or transceiver, where the optical signals may have a predetermined preamble, predetermined time slots for transmission, and/or different threshold voltages for detection and/or determination of binary data.

DISCUSSION OF THE BACKGROUND

Passive optical networks (PONs) can be utilized to provide data from one or more user nodes (e.g., an optical network unit [ONU], optical network terminal [ONT], etc.) to a central node (e.g., a central office, such as or including an optical line terminal [OLT]) using optical signal media (e.g., a fiber optic cable, a fiber optic link, etc.). In some PONs, time-division multiplexing (TDM) is used so that multiple bit streams or data signals (e.g., data packets) are alternately transmitted by one or more ONUs over a single communication channel. That is, in PONs employing TDM, a first ONU can transmit optical data during an allocated or predetermined time slot, and a second ONU can transmit optical data over the same media in the next allocated or predetermined time slot.

For a data packet to be accurately received by the OLT (e.g., including a burst mode optical receiver), a decision threshold must be set. That is, based on the amplitude or common-mode voltage of the received data signal, a decision threshold is set, where data having an amplitude above the decision threshold are considered to have a binary logic high state, and data having an amplitude below the decision threshold are considered to have a binary logic low state.

In some PONs, situations arise where a first ONU transmits optical data during a predetermined time slot to a receiver, and a second transmitter (e.g., a "rogue" transmitter) also transmits data to the receiver during the same predetermined time slot. For example, prior to transmission, the second transmitter may have improperly processed a data or control signal (e.g., from an external host) configured to place the ONU in a silent (e.g., a non-transmission) state. Alternatively, a hardware failure may have prevented the second ONU from switching to or remaining in a silent state. In either situation, the optical data signal transmitted by the first ONU may be incorrectly processed when data from the second ONU is also transmitted during the predetermined time slot. For example, some of the data received by the first ONU may be erroneously considered to have a high binary logic state (i.e., an amplitude above a decision threshold) when data received by the second, rogue transmitter has a high binary logic state.

Additionally, situations arise when a first ONU is transmitting optical data to the OLT during a predetermined time slot, but the optical data is improperly received due to noise introduced in the PON. Current OLTs cannot identify or distinguish a noise spike or a rogue data transmission received during a predetermined time slot from data transmitted from an authorized ONU during the predetermined time slot. Thus, for example, a noise spike having an amplitude above the decision threshold may be introduced in the PON during a predetermined time slot. The noise spike may be incorrectly processed as data having a binary logic high state (e.g., a binary "1" data bit) and provided by an authorized ONU configured to transmit data during the predetermined time slot. Thus, current OLTs may incorrectly process the optical data as having a binary logic high state, resulting in incorrect or inaccurately processed data. Inaccurately detected or processed data can lead to erroneous processing of the received data signal by receiver circuitry.

Embodiments of the present invention advantageously provide an optical and/or optoelectronic receiver and/or transceiver capable of quickly and reliably detecting data packets. For example, the present invention can be used to distinguish a data signal from interference (e.g., a noise signal or a rogue data transmission), thereby increasing the reliability of data signal detection in optical and/or optoelectronic receivers and/or transceivers. Additionally, embodiments of the present invention can allow for increased voltage threshold control. These and other advantages of the present invention will become readily apparent from the detailed description of preferred embodiments below.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention is directed to a detection circuit comprising (i) a first circuit configured to regulate or control a DC offset of a differential input signal; and (ii) a second circuit coupled to the first circuit, the second circuit configured to, when a voltage difference between true and complementary nodes of the differential input signal is above a predetermined threshold, indicate a presence of a data signal at the differential input signal. In various embodiments, the detection circuit further comprises a filter configured to receive the differential input signal and provide a filtered differential input signal to the first circuit. In some embodiments, the filter comprises one or more RC, LC, or RLC circuits. In further embodiments, the RC, LC, or RLC circuit(s) comprise a capacitor in series with a resistor and/or an inductor.

Additionally, embodiments of the present invention relate to an optical and/or optoelectronic receiver and/or transceiver, and methods of detecting a differential data signal. The optical and/or optoelectronic receiver and/or transceiver generally comprises the detection circuit discussed above, and an amplifier coupled to the detection circuit, wherein the amplifier is configured to provide the differential input signal. In some embodiments, the optical and/or optoelectronic receiver and/or transceiver further comprises a photodiode configured to convert an optical signal to an electrical signal to be processed by the amplifier. In further embodiments, the optical and/or optoelectronic receiver and/or transceiver further comprises a microprocessor or microcontroller configured to execute one or more commands to determine when the voltage differential between the true and complementary nodes of the differential input signal is above the predetermined threshold.

The method of detecting a differential data signal generally comprises (i) controlling or regulating a voltage offset of a differential node configured to receive the differential data signal; (ii) latching or storing the controlled or regulated differential data signal; and (iii) when a voltage differential between true and complementary nodes of the differential node is above a predetermined threshold, indicating a presence of the differential data signal. In some embodiments, the method comprises filtering the differential data signal prior to regulating or controlling the differential data signal. In additional embodiments, filtering the differential data signal comprises passing the differential data signal through one or more RC, LC, or RLC circuits. In further embodiments, latching or storing the controlled or regulated differential data signal comprises sampling the differential data signal using a flip-flop.

Various embodiments and/or examples disclosed herein may be combined with other embodiments and/or examples, as long as such a combination is not explicitly disclosed herein as being unfavorable, undesirable or disadvantageous.

The present detection circuit advantageously provides fast and accurate data signal detection in optical and/or optoelectronic receivers and/or transceivers. The present detection circuit can quickly detect a data signal and remove or identify interference prior to providing the received data signal to other downstream circuitry in an optical and/or optoelectronic receiver or transceiver. The present invention can be used, for example, to distinguish a data signal from interference (e.g., noise signal or a data signal transmitted by a rogue transmitter), and identify and/or remove any such interference from the received signal(s).

These and other advantages of the present invention will become readily apparent from the detailed description of various embodiments below.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

For the sake of convenience and simplicity, the terms "optical" and "optoelectronic" are generally used interchangeably herein, and use of either of these terms also includes the others, unless the context clearly indicates otherwise. Additionally, the term "transceiver" refers to a device having at least one data receiver and at least one data transmitter, and use of the term "transceiver" also includes the terms "receiver" and "transmitter," unless the context clearly indicates otherwise. Similarly, the teams "optical signal" and "light" are generally used interchangeably herein, and use of either one of these terms also includes the other, unless the context clearly indicates otherwise. Also, for convenience and simplicity, the terms "connected to," "coupled with," and "coupled to" (which terms also refer to direct and/or indirect relationships between the connected, coupled and/or communicating elements unless the context of the term's use unambiguously indicates otherwise) may be used interchangeably, but these terms are also generally given their art-recognized meanings.

The present invention concerns methods and apparatuses for detecting and/or recovering a data signal from an optical signal quickly and accurately, and enjoys particular advantages in optical network (e.g., PON) receivers and/or transceivers. A fast and accurate optical receiver and/or transceiver according to the present invention can be used in high bandwidth networks so that data is identified and processed with minimal or no error. By using the present threshold setting and data detection circuitry, a voltage threshold of the present threshold control circuit can be adjusted or changed. By utilizing the present threshold setting and data detection circuit, an optical receiver and/or transceiver can quickly distinguish between a transmitted data signal and interference (e.g., noise or a rogue data transmission). In some embodiments, a filter can be coupled to the present detection circuit to remove or significantly reduce the number and/or effect of interference. Thus, the present invention avoids problems associated with conventional optical receivers and/or transceivers (e.g., inadvertently processing interference [such as noise or rogue data transmissions] along with data signals).

The invention, in its various aspects, will be explained in greater detail below with respect to exemplary embodiments.

An Exemplary Optical and/or Optoelectronic Network

Figure 1:
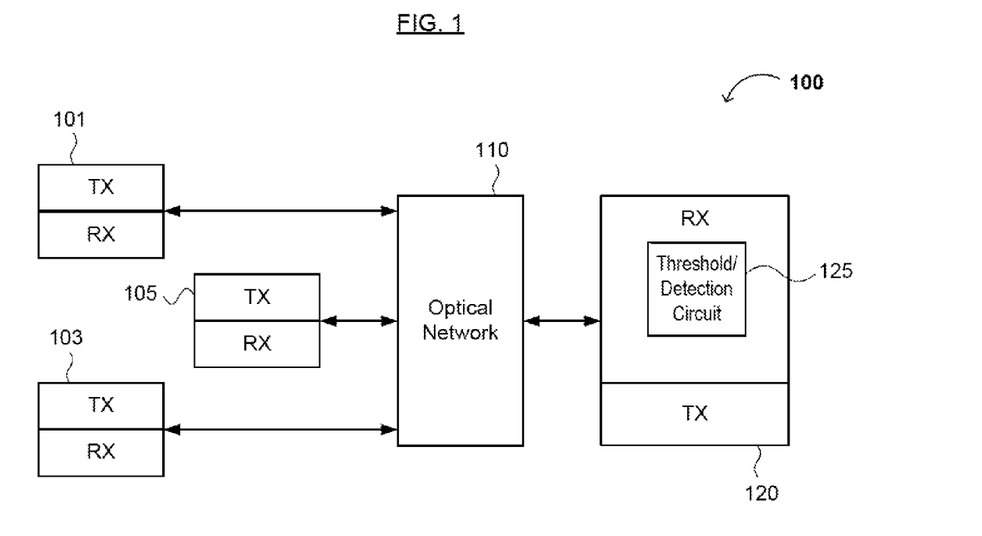
FIG. 1 is a diagram showing an exemplary optical and/or optoelectronic network according to the present invention.

FIG. 1 shows an exemplary optical and/or optoelectronic network 100 according to the present invention. As shown, optical and/or optoelectronic network 100 (e.g., a PON) comprises a first optical transceiver 101, a second optical transceiver 103, a third optical transceiver 105, optical network communications hardware 110, and OLT (e.g., optical transceiver) 120. Optical transceiver 120 comprises a threshold setting and data detection circuit 125. Optical transceivers 101, 103, and 105 each comprise a transmitter (TX) that transmits a data signal over the optical network 110 to optical transceiver 120. In many embodiments, the data signal comprises one or more data blocks, such as data packets, frames, pages, sectors, cells, payloads, etc.

Optical network communications hardware 110 (e.g., an optical distribution network [ODN]) may include, e.g., one or more multiplexers, demultiplexers, optical splitters, repeaters, etc. Thus, data signals received from the transceivers 101-105 may be time-multiplexed so that optical transceiver 120 can receive transmitted data from a particular transceiver 101, 103, or 105 (e.g., through a multiplexer) at a predetermined or preassigned time slot or window. In alternative embodiments, optical network communications hardware 110 may comprise circuitry configured to receive data signals from optical transceivers 101-105 (e.g., ONUs or ONTs), select one of the received data signals to provide to optical receiver 120, and provide the selected data signal to threshold setting and data detection circuit 125 at a predetermined time.

Threshold setting and data detection circuit 125, as discussed below in greater detail, can accurately and quickly detect or identify a new data block (e.g., a data packet) in an optical data network, and provide the new data packet to optical receiver 120. Threshold setting and data detection circuit 125 effectively filters or identifies and removes interference (e.g., noise signals or signals transmitted by rogue transmitters and/or transceivers) from a received data signal (e.g., a data signal transmitted by one of transceivers 101-105).

Exemplary Optical Receiver Circuitry

Figure 2:
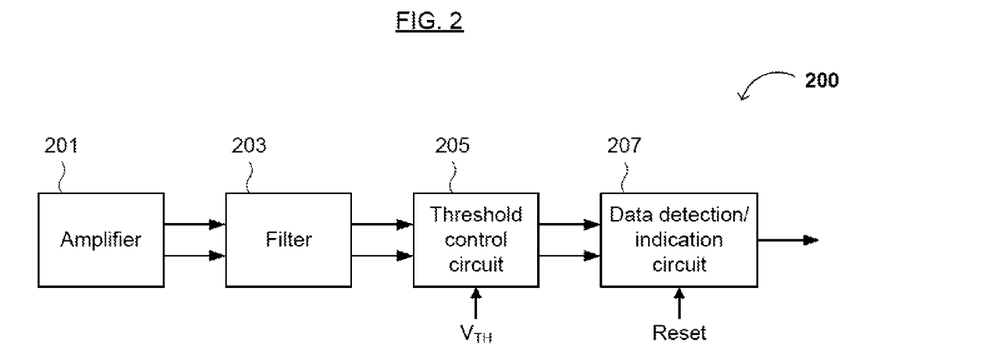
FIG. 2 is a block diagram of an exemplary optical receiver path in the OLT of FIG. 1.

FIG. 2 illustrates an exemplary block diagram of optical receiver circuitry 200 including the threshold setting and data detection circuit 125 of FIG. 1. As shown, optical receiver circuitry 200 comprises an amplifier 201, optional filter 203, threshold control circuit 205, and a data detection/indication circuit 207.

Amplifier 201 can be a differential amplifier or any other amplifier (e.g., a buffer) configured to provide a differential signal. Filter 203 can be any type of filter configured to receive a differential input signal and output a filtered differential signal. For example, in one embodiment, filter 203 comprises one or more RC, LC, or RLC circuits. In a further embodiment, the RC, LC, or RLC circuit(s) comprise a capacitor in series with a resistor and/or an inductor. In another embodiment, filter 203 comprises a first. RLC circuit coupled to a true node of the differential input signal and a second RLC circuit coupled to the complementary node of the differential input signal.

Threshold control circuit 205 generally comprises a plurality of resistors. For example, threshold control circuit 205 may comprise a first resistor electrically connected to a first power supply and one of the true and complementary nodes of a differential input signal, a second resistor electrically connected between the true and complementary nodes, and a third resistor electrically connected to a second power supply and the other of the true and complementary nodes. The second power supply or voltage source can be configured to control or regulate a voltage threshold when the differential input signal includes data. Thus, depending on the incoming data signal received, the threshold can be increased or decreased.

When a voltage difference between the true and complementary nodes of the differential input signal is equal to or above a predetermined threshold, data detection/indication circuit 207 is configured to indicate the presence of a data signal at the differential input signal. Data detection/indication circuit 207 generally comprises a dual input flip-flop (e.g., a flip-flop capable of receiving a first signal and a complement of the first signal). In one embodiment, data detection/indication circuit 207 comprises a JK or an RS flip-flop. In further embodiments, data detection/indication circuit 207 comprises a timer configured to determine a length of time between consecutive transitions of a differential input signal after the differential input signal increases above the predetermined threshold. In further embodiments, data detection/indication circuit 207 comprises a counter configured to count a number of consecutive transitions during a predetermined time interval. In even further embodiments, data detection/indication circuit 207 comprises logic configured to receive an output of the timer and an output of the counter, and indicate the presence of a data signal. For example, data detection/indication circuit 207 may indicate the data signal when the number of consecutive transitions during a predetermined time interval is equal to a predetermined number. Thus, the present optical receiver circuitry 200 can prevent or stop the further processing of unauthorized signals or interference (e.g., noise) having an amplitude above the threshold for detecting data if the number of consecutive transitions during the predetermined time interval is not equal to the predetermined number (i.e., the number of transitions expected for a data signal from a preassigned or predetermined transmitter in the optical network).

Distinguishing interference from an authorized data transmission can include determining or identifying an optical packet signature (e.g., a binary logic signal beginning with a "1010" preamble pattern) or a data signal that transitions a certain integer number of times during a predetermined time interval. This frequency domain signature (e.g., optical packet preamble) can be used to indicate the presence of a data signal. That is, since it is highly unlikely that interference or noise generates the same number of transitions during the same predetermined time interval as a data packet preamble or other data block signature or identifier, any signal providing the preamble, signature or identifier can be identified as the data signal.

As shown, amplifier 201 is configured to provide a signal (e.g., a differential signal) to filter 203. Filter 203 is configured to filter (e.g., remove interference such as noise) the received differential signal and provide a filtered differential signal to threshold control circuit 205. Generally speaking, filter 203 may be tuned to the center frequency or rate of the data in the differential signal. Tuning the frequency of the filter 203 to the center frequency of the data signal significantly removes (or filters) signals or disturbances not operating at the rate of data transmission (e.g., noise, rogue data transmissions, etc.). That is, since it is likely that such interference does not operate at the center frequency of the data signal, filtering frequencies other than the center frequency minimizes or avoids the possibility of interference being processed by the threshold control circuit 205.

As shown, threshold control circuit 205 is coupled to a second voltage source (not shown) that provides a voltage $V_{TH}$. As discussed below in greater detail, voltage $V_{TH}$ sets or determines a detection threshold for the filtered differential data signal. Threshold control circuit 205 provides the filtered differential data signal to data detection/indication circuit 207, which detects or indicates the presence of the data signal.

As discussed below in greater detail, the present optical receiver circuitry 200 can accurately and quickly distinguish or identify a data signal from a signal of another source (e.g., noise or a rogue transmitter) in an optical data network.

A First Exemplary Detection Circuit

Figure 3:
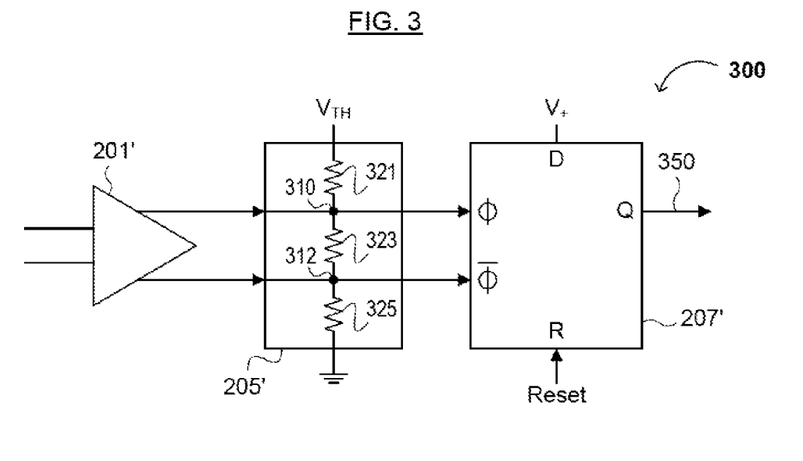
FIG. 3 is a diagram showing a first exemplary embodiment of the threshold setting and data detection circuitry of FIG. 2.

FIG. 3 shows a diagram illustrating a first exemplary embodiment 300 of the threshold setting and data detection circuitry of FIG. 2. As shown, threshold setting and data detection circuitry 300 comprises exemplary circuitry for the optical receiver 200 of FIG. 2, and those structures having the same identification numbers discussed below with respect to FIG. 3 may be substantially the same as those discussed above with respect to FIG. 2.

As shown, threshold setting and data detection circuitry 300 comprises an amplifier 201', threshold control circuit 205', and a data detection/indication circuit 207'. Amplifier 201', threshold control circuit 205', and data detection/indication circuit 207' can be the same or substantially the same as amplifier 201, threshold control circuit 205, and data detection/indication circuit 207 discussed above with respect to FIG. 2, respectively.

Specifically, threshold control circuit 205' comprises first resistor 321 (e.g., $R_1$), second resistor 323 (e.g., $R_2$), and third resistor 325 (e.g., $R_3$). As shown, resistors 321-325 are arranged in a serial fashion across a voltage differential, similar to a voltage divider. First resistor 321 is coupled between a voltage $V_{TH}$ and second resistor 323. Second resistor 323 is electrically connected between true and complementary nodes 310 and 312. Third resistor 325 is electrically connected between a ground source (not shown) and to complementary node 312. In some embodiments, each of the first, second, and third resistors 321-325 have the same resistivity (e.g., $R_1 = R_2 = R_3$), and in other embodiments, the first and third resistors 321 and 325 have the same resistivity, while the second resistor 323 has a different resistivity (e.g., $R_1 = R_3 \gg R_2$). In various embodiments, the resistivities of resistors 321-325 may be from 10 to 1M ohms (e.g., 50-100K ohms, or any value or range of values therein). The resistance values of resistors 321-325 are generally sufficient to enable data detection/indication circuit 207' to accurately receive and process the differential data signal.

Voltage $V_{TH}$ sets a DC voltage threshold for the incoming differential data signal 310/312. For example, when $V_{TH}$ is equal to about 1.5V, the voltage at which data detection/indication circuitry latches onto the received data signal is equal to or greater than about 1.5V. In various embodiments, $V_{TH}$ is equal to about 0.5V, 0.8V, 1.0V, 1.5V, 2V, 2.5V, or any other value(s) sufficient to ensure accurate detection and/or reception of the received data signal. Voltage $V_{TH}$ may be provided by a circuit configured to determine a voltage threshold of the incoming differential signal (e.g., a peak detector). Alternatively, resistor 321 may be coupled to a second voltage source or power supply (not shown) configured to provide a voltage that functions similarly to $V_{TH}$. Additionally, node 310 of threshold control circuit 205' is coupled to a first input terminal (e.g., a φ or true data input terminal) of data detection/indication circuit 207'. Node 312 of threshold control circuit 205' is coupled to a second input terminal (e.g., a or complementary data input terminal) of data detection/indication circuit 207'.

As shown, amplifier 201' provides a differential data signal for which threshold control circuit 205' sets a DC offset (e.g., between true and complementary nodes 310 and 312) as the data signal is received, sampled or latched by data detection/indication circuit 207'. Data detection/indication circuit 207' is also coupled to a voltage source $V_+$ (e.g., at a D input terminal) and a reset signal (e.g., at an R input terminal). As discussed below, depending on the state of the differential data signal at true and complementary nodes 310/312, a signal 350 having a high binary logic state or a low binary logic state may be output by data detection/indication circuit 207' (e.g., by a Q output terminal to other downstream circuitry in the optical and/or optoelectronic receiver or transceiver, not shown).

When a voltage difference between true and complement signal nodes 310 and 312 is equal to or greater than voltage $V_{TH}$, data detection/indication circuit 207 detects the presence of a data signal (e.g., by latching the received data signal) and provides an output signal 350 having a high binary logic state, indicative of the presence of a data signal at nodes 310 and 312. When a voltage difference between true and complement signal at true and complementary nodes 310 and 312 is less than $V_{TH}$, the presence of a data signal is not detected by data detection/indication circuit 207. Thus, data detection/indication circuit 207 outputs signal 350 having a low binary logic state. Thus, using the present detection circuit, an optical and/or optoelectronic receiver and/or transceiver can quickly determine a voltage threshold for a received data signal, and a data signal can be quickly detected (e.g., within 10 ns after the beginning of a new data packet).

A Second Exemplary Threshold Detection Circuit

Figure 4:
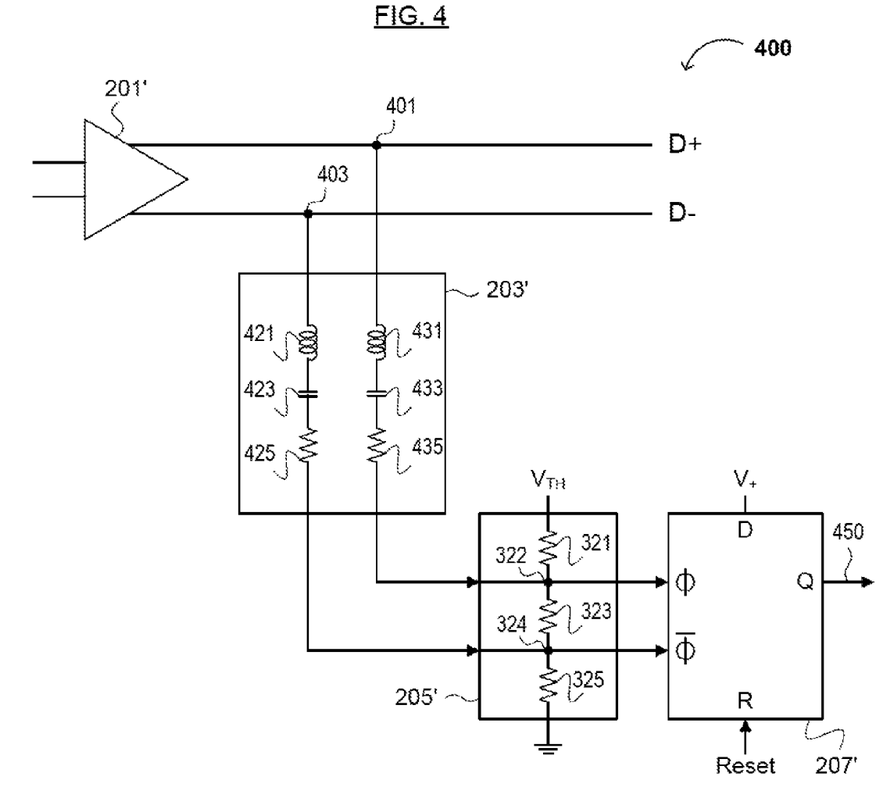
FIG. 4 is a diagram showing a second exemplary embodiment of the threshold setting and data detection circuitry of FIG. 2.

FIG. 4 shows a diagram illustrating a second exemplary embodiment 400 of the threshold setting and data detection circuitry of FIG. 2. As shown, threshold setting and data detection circuitry 400 comprises circuitry similar to that of threshold setting and data detection circuitry 300 of FIG. 3 and threshold setting and data detection circuitry 200 of FIG. 2, and those structures having the same identification numbers discussed below with respect to FIG. 4 may be substantially the same as those discussed above with respect to FIGS. 2-3.

As shown, threshold setting and data detection circuitry 400 comprises, an amplifier 201', filter 203', threshold control circuit 205', and a data detection/indication circuit 207'. Amplifier 201', threshold control circuit 205', and data detection/indication circuit 207' can be the same or substantially the same as amplifier 201, threshold control circuit 205, and data detection/indication circuit 207 discussed above with respect to FIG. 2, respectively.

As shown in FIG. 4, filter 203' comprises first and second RLC circuits, respectively comprising first inductor 421, first capacitor 423, and first resistor 425, and second inductor 431, second capacitor 433, and second resistor 435. As shown, the components 421-425 are serially connected between complementary data nodes 403 and 324, and the components 431-435 are serially connected between true data nodes 401 and 322.

As shown, amplifier 201' provides a differential data signal to filter 203' at true and complementary nodes 401 and 403. Filter 203' is an analog filter having a resonant frequency centered or timed to about the frequency of the differential data signal 401/403. Filter 203' is therefore configured to remove or filter those signals not having a frequency near or equal to the frequency of the differential data signal at nodes 401/403. Filter 203' provides a filtered differential data signal to threshold control circuit 205' at nodes 324/322. For example, when an optical data signal having a frequency of about 1 Gbps is provided to the present optical receiver circuitry 400, the maximum frequency of the data (as defined by alternating transitions between binary logic states, such as the "1010" signature in the preamble of one or more data packet formats) is about 500 MHz. Thus, in such an embodiment, filter 203' is a band-pass filter having a center frequency of about 500 MHz. In other embodiments, the center frequency of the filter may be from about 5 KHz to about 5 GHz, or any value or range of values therein. By utilizing a filter 203' tuned to the center frequency of the received data signal, interference or unintended signals not having a frequency equal to or approximately equal to the center frequency of the received data signal may be rejected by filter 203' (e.g., signals such as those introduced by noise, rogue data transmissions, etc.). Thus, filtering or removing signals not operating at the center frequency increases the probability of successful data detection and improves reliability.

As discussed above, threshold control circuit 205' controls the voltage threshold between true and complementary nodes 322 and 324. As discussed above with respect to threshold control circuit 205' of FIG. 3, voltage threshold $V_{TH}$ may be provided by a circuit configured to set a voltage threshold for the incoming differential signal. The voltage threshold can be used by data detection/indication circuit to identify a signal having an amplitude above the voltage threshold as a data signal. Alternatively, threshold control circuit 205' may be coupled to a second voltage source or power supply (not shown) configured to provide a voltage that functions similarly to $V_{TH}$. Threshold control circuit 205' provides a filtered and voltage-regulated or -controlled differential data signal at true and complementary nodes 322/324 to data detection/indication circuit 207'.

Additionally, threshold control circuit 205' provides a degree of DC isolation to the differential data signal at nodes 322/324. Thus, the voltage differential at true and complementary nodes 322/324 is independent of the receiver voltage source or main power supply (not shown). That is, the differential data signal at nodes 322/324 is immune to voltage fluctuations or variations that may occur in the receiver voltage or power source. Thus, fluctuations in the optical receiver voltage source (e.g., a main power supply) or the voltage threshold $V_{TH}$ provided by threshold control circuit 205' do not affect the voltage differential across the true and complementary nodes 322 and 324 of the received differential data signal.

As discussed below, depending on the state of the differential data signal at nodes 322/324, a high or a low binary state logic signal 450 may be output by the data detection/indication circuit 207' (e.g., to downstream circuitry in the optical receiver). That is, when a data signal is detected (e.g., a voltage potential across nodes 322 and 324 is greater than or equal to $V_{TH}$), data detection/indication circuit 207' latches the data signal and outputs a high binary logic state signal 450 that indicates the presence of a data signal (e.g., a data packet is received in the receiver including threshold setting and data detection circuitry 400).

As shown, the filtered differential data signal 322/324 is provided to data detection/indication circuit 207'. Since the data detection/indication circuit 207' latches the filtered differential data signal 322/324 free or substantially free of interference, the present threshold setting and data detection circuitry 400 can substantially increase the reliability of data detection and/or indication(s) in optical or optoelectronic data receivers and/or transceivers. Thus, using the data detection/indication circuitry 400 of FIG. 4, an optical and/or optoelectronic receiver can effectively set or control a threshold for detecting and processing a received data signal, remove any interference (e.g., noise or rogue data transmissions) from the incoming signal, and quickly indicate the presence of a valid data signal.

A Third Exemplary Threshold Detection Circuit

Figure 5:
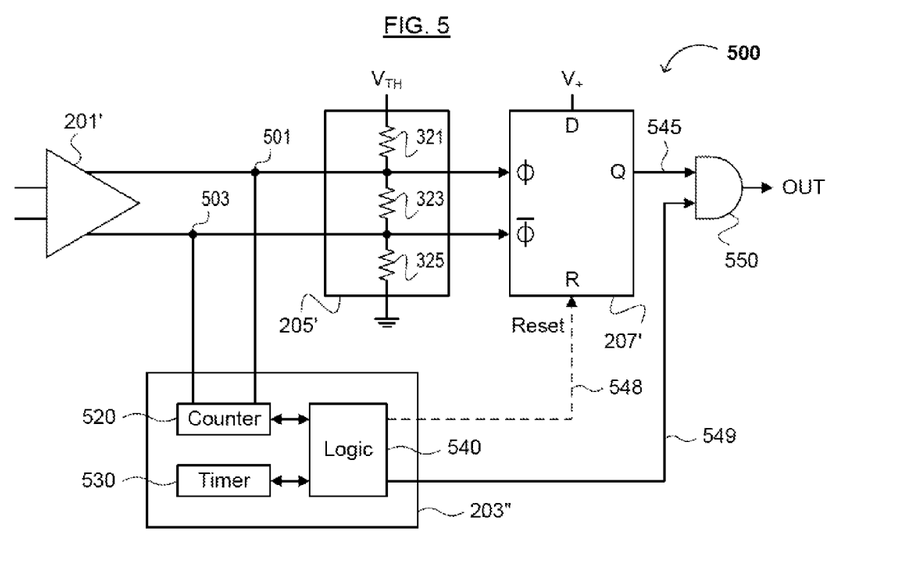
FIG. 5 is a diagram showing a third exemplary embodiment of the threshold setting and data detection circuitry of FIG. 2.

FIG. 5 illustrates a third exemplary threshold setting and data detection circuit 500 according to the present invention. As shown, threshold setting and data detection circuit 500 comprises circuitry similar to that of threshold setting and detection circuits 200, 300 and 400 of FIGS. 2-4, and those structures having the same identification numbers discussed below with respect to FIG. 5 may be substantially the same as those discussed above with respect to FIGS. 2-4.

As shown, threshold setting and data detection circuitry 500 comprises differential amplifier 201', filter or filtering circuitry 203", threshold control circuit 205', data detection/indication circuit 207', and logic gate 550. Amplifier 201', threshold control circuit 205', and data detection/indication circuit 207' can be the same or substantially the same as amplifier 201', threshold control circuit 205', and data detection/indication circuit 207', respectively discussed above with respect to FIG. 4. For example, as shown, threshold control circuit 205' can comprise resistors 321, 323, and 325 as discussed above with respect to FIG. 3.

As shown in FIG. 5, filter or filtering circuitry 203" comprises counter 520, timer 530, and logic 540. Counter 520 is configured to count a number of transitions of the differential signal received at true and complementary nodes or differential signal line 501/503, and timer 530 is configured to indicate the end of a predetermined time interval during which the number of transitions of the differential signal 501/503 are counted. Alternatively, timer 530 may be configured to determine a length of time between consecutive transitions of differential signal 501/503 after a voltage differential in the differential signal increases above a predetermined threshold. Logic 540 is configured to receive outputs from timer 530 and counter 520, and indicate the presence of a data signal (e.g., when the predetermined number of transitions in the differential signal at nodes 501/503 occur during the predetermined time interval). By counting the number of transitions on differential input line 501/503 during the predetermined time period (e.g., a length of time equal or equivalent to the length of the preamble of the data packet or data block), the digital filter 203" can determine the presence of a valid data packet or block.

For example, logic 540 may provide an indication of the presence of a data signal when the number of transitions during the predetermined time interval is equal to a predetermined number. Typically, the predetermined number of transitions is that of a preamble or other standard initial data sequence indicating the presence of a data block. In the case where a "1010" sequence indicates the presence of a data packet, the predetermined number of transitions is three (3), and the predetermined time period is greater than three (3) bit lengths, but less than or about four (4) bit lengths. Alternatively, in the case where a "101010" sequence indicates the presence of a data packet, the predetermined number of transitions is five (5), and the predetermined time period is greater than five (5) bit lengths, but less than or about six (6) bit lengths. One skilled in the art can easily design logic configured to determine whether the number of transitions counted by counter 520 during the time interval defined by the timer 530 matches a predetermined number.

In some embodiments, when logic 540 does not provide an indication of a data signal, the present optical receiver circuitry 500 can prevent or stop the further processing of unintentional signals or interference (e.g., noise) having an amplitude above the threshold for detecting data. For example, if the data signal received on differential signal line 501/503 does not transition the predetermined number of times during the predetermined time interval (i.e., the number of transitions expected for a data signal from a preassigned or predetermined transmitter in the optical network), further processing of the received data signal can be stopped.

When the voltage on differential signal line 501/503 transitions above $V_{TH}$, counter 520 begins to count successive transitions above or below $V_{TH}$, and timer 530 measures the predetermined time interval. Timer 530 may begin the predetermined time interval upon the transition on differential signal line 501/503 or upon the first count by counter 520. When the timer 530 indicates the end of the predetermined time interval, the data signal transition count output by counter 520 is compared to a predetermined number. Optionally, the data signal transition count is latched by logic 540, and logic 540 may store in nonvolatile memory or receive from another source the predetermined number of data signal transitions corresponding to a valid data block (e.g., a data packet). When the data signal transition count matches the predetermined number, logic 540 provides a "valid data" indication/signal 549 to logic gate 550. In the example shown in FIG. 5, the logic gate 550 is an AND gate, and signal 549 has an active high binary logic state. However, other combinations of logic gates and active signal states can be easily envisioned by those skilled in the art.

For example, when an optical data signal operating at about 1 Gbps is provided to the optical receiver circuitry 500, the maximum frequency of a sinusoidal wave defined by alternating digital states (e.g., the "1010" preamble) is about 500 MHz. Thus, the predetermined time interval is about 1 ns. In such an embodiment, if logic 540 determines that successive data transitions are occurring at or at about 1 ns intervals, logic 540 determines that a valid data signal is being received, and a "valid data received" signal 549 is provided to logic gate 550.

When logic 540 determines that the data signal transition count does not match the predetermined number, the transition(s) are considered interference (e.g., a noise signal and/or a rogue data transmission), and logic 540 provides an "invalid data" indication/signal 549 to the logic gate 550. In the example shown in FIG. 5, "invalid data" indication/signal 549 has a low binary logic state. When the data signal transition count does not match the predetermined number, logic 540 may also reset the data detection/indication circuit 207' (e.g., via signal 548), as well as each of counter 520 and timer 530.

Threshold control circuit 205' receives the differential data signal at nodes 501 and 503, controls or sets the voltage threshold of the differential data signal, and provides a voltage-controlled differential data signal 501/503 to data detection/indication circuit 207'. When the voltage of the differential data signal is greater than a voltage $V_{TH}$, data detection/indication circuit 207' latches the differential data signal 501/503 and provides a true data signal 545 to logic gate 550. When "valid data" signal 549 has a high binary logic state signal, the signal output from logic gate 550 (e.g., signal OUT) is representative of a valid or authorized data signal (and may be, e.g., provided to electrical circuitry [not shown] downstream from the optical receiver circuitry 500).

Thus, the present optical receiver circuitry effectively removes or substantially minimizes interference and detects and/or indicates the presence of valid and/or authorized data signal transmissions, thereby increasing data detection reliability in optical and/or optoelectronic receivers and/or transceivers.

An Exemplary Optical and/or Optoelectronic Receiver

Figure 6:
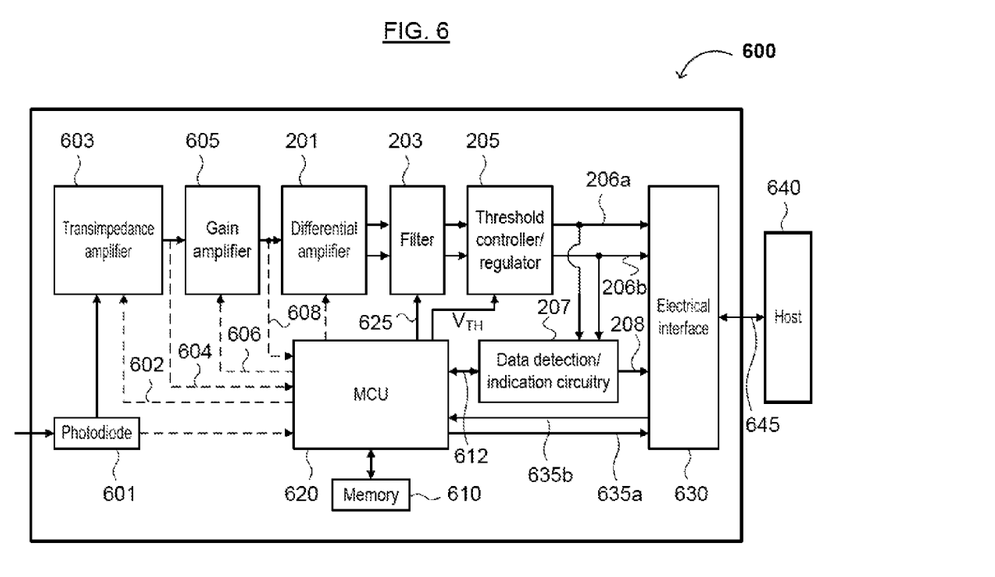
FIG. 6 is a diagram showing an exemplary optical and/or optoelectronic receiver according to the present invention.

FIG. 6 shows an exemplary optical and/or optoelectronic receiver 600 according to the present invention. As shown, optical receiver 600 comprises photodiode 601, transimpedance amplifier 603, gain amplifier 605, differential amplifier 201, filter 203, threshold controller/regulator 205, data detection/indication circuitry 207, electrical interface 630, MCU 620, and memory 610. Thus, optical and/or optoelectronic receiver 600 comprises the same structures as (or structures similar to) those of optical and/or optoelectronic receiver circuitry 200 of FIG. 2 and threshold setting and detection circuits 300, 400 and 500 of FIGS. 3-5, where structures in optical and/or optoelectronic receiver circuitry 200 having the same identification numbers discussed below with respect to FIG. 6 may be the same or substantially the same as those discussed above with respect to FIGS. 2-5. Additionally, optical and/or optoelectronic receiver 600 can be an example of the optical receiver in optical transceiver 120 in FIG. 1 discussed above.

Photodiode 601 can be any device configured to receive an optical signal (e.g., from an optical transmitter such as those included in optical transceivers 101, 103, or 105 in FIG. 1) and provide a corresponding electrical signal. For example, photodiode 601 can be an avalanche photodiode (APD) or a p-type/intrinsic/n-type (PIN) photodiode. Transimpedance amplifier 603 can be any amplifier configured to convert a current (e.g., a signal characterized by a current value) to a voltage (e.g., a signal characterized by a voltage value). Additionally, gain amplifier 605 can be any device configured to amplify an electrical signal (e.g., a voltage) and provide an amplified electrical signal.

Amplifier 201, filter 203, threshold control circuit 205, and data detection/indication circuit 207 can be the same as or substantially the same as amplifier 201, filter 203, threshold control circuit 205, and data detection/indication circuit 207 discussed above with respect to FIG. 2. For example, in some embodiments, filter 203 comprises one or more RC, LC, and/or RLC circuits. In other embodiments, filter 203 comprises a counter configured to count transition(s) of the differential signal output from differential amplifier 201 during a predetermined time interval, a timer configured to determine a beginning and end of the predetermined time interval, and logic configured to (i) compare the transition count with a predetermined number, and (ii) determine whether the transition count and the predetermined number are equal. As described herein, a valid data signal is present when the transition count and the predetermined number are equal. Thus, similar to data detection/indication circuit 207' of FIG. 5, the data detection/indication circuit 207 can be configured to provide a signal 208 indicative of the presence of a valid data signal.

Electrical interface 630 can be any interface capable of accurately and/or quickly transferring data and/or signals (e.g., a differential data signal 206a-b, control and/or data signals 635a-b between MCU 620 and interface 630, and control and/or data signals on bus 645 between interface 630 and host 640) between the external host 640 and the optical receiver 600. In various embodiments, MCU 620 can be a microprocessor, microcontroller, field programmable gate array (FPGA), application-specific integrated circuit (ASIC), or complex programmable logic device (CPLD) configured to control and/or adjust various functions of optical receiver 600. For example, MCU 620 can, in response to optional inputs from transimpedance amplifier 603 and/or gain amplifier 605, automatically adjust the amplification of transimpedance amplifier 603 and/or gain amplifier 605 using an automatic gain control (AGC) scheme and/or algorithm. MCU 620 may also provide and/or receive one or more control and/or data signals 635a-b (e.g., instructions, configuration data, gain settings, status flags relating to one or more operations of the receiver 600, etc.) to or from the host 640 via the electrical interface 630. Memory 610 is configured to store data (e.g., AGC targets, the predetermined number of transitions, the predetermined time interval, temperature-based power/current adjustments, etc.) from MCU 620 or for use by MCU 620.

MCU 620 may be configured to provide configuration data to filter 203 on bus 625, the signal detection threshold voltage $V_{TH}$ to threshold controller/regulator 205, and a control signal to data detection/indication circuitry 207 on bus 612. Data detection/indication circuitry 207 may be configured to provide a control signal to MCU 620 on bus 612. In one embodiment, the signal 612 from data detection indication circuitry 207 to MCU 620 is a "valid data received" signal (e.g., similar to the "valid data" signal 549 of FIG. 5). In one embodiment (not shown), the control signal 612 from MCU 620 is a reset signal (e.g., equivalent to reset signal 548 in FIG. 5; see also FIGS. 2-4).

Additionally, MCU 620 is configured to receive various signals from circuitry in receiver 600 (e.g., data detection/indication circuit 207, memory 610, etc., and optionally, transimpedance amplifier 603 and/or gain amplifier 605). MCU 620 may also control circuitry in receiver 600 (e.g., data detection/indication circuitry 207, gain amplifier 605, etc.). For example, MCU 620 may be configured to receive voltage signal 604 from transimpedance amplifier 603, determine the amplitude of voltage signal 604, and provide a feedback signal 602 to transimpedance amplifier 603. The feedback signal 602 can be configured to adjust (e.g., increase or decrease) the gain of the transimpedance amplifier 603. Similarly, MCU 620 can be configured to receive amplified voltage signal 608 from gain amplifier 605, determine the gain of amplified voltage signal 608, and provide a feedback signal 606 and/or 602 to control the gain of gain amplifier 605 and/or transimpedance amplifier 603, respectively.

Optical and/or optoelectronic receiver 600 is configured to receive an optical data signal at photodiode 601. The optical data signal is converted by photodiode 201 to an electrical data signal (e.g., an analog and/or current-based signal), which is then provided to transimpedance amplifier 603. Optionally, MCU 620 can be configured to receive an electrical signal from photodiode 201. Transimpedance amplifier 603 receives the electrical data signal and provides a voltage-based data signal 604 to gain amplifier 605. Gain amplifier 605 provides an amplified data signal 608 to differential amplifier 201. Differential amplifier 201 provides a differential data signal to filter 203. Filter 203 removes or reduces the amount of interference (e.g., noise) in the differential data signal and provides a filtered differential data signal to threshold controller/regulator 205. Threshold controller/regulator 205 receives the filtered differential data signal and provides a threshold-regulated differential data signal to data detection/indication circuitry 207. Similar to threshold control circuit 205 of FIG. 2, threshold controller/regulator 205 controls the voltage at which data detection/indication circuitry 207 latches and/or detects a valid data signal.

When the amplitude of the data signal (e.g., at 206a-b) is greater than the threshold voltage set by threshold controller/regulator 205, data detection/indication circuitry 207 latches the data signal and may indicate the presence of valid data. In some embodiments where filter 203 is a digital filter, a signal (e.g., signal 208 and/or a signal on bus 612) indicative of valid data (e.g., a data block such as a data packet) may be provided by logic configured to determine whether a predetermined number of transitions of the data signal (e.g., at differential signal lines 206a-b) occur during a predetermined time period (e.g., about equal to the length of a preamble of the data block). In one embodiment, threshold controller/regulator 205 also provides the signal on differential signal lines 206a-b to electrical interface 630. Alternatively, data detection/indication circuitry 207 may provide a single-ended data signal (e.g., signal 208) to electrical interface 630.

Thus, the present optical receiver circuitry 600 can easily, quickly and effectively determine or distinguish a valid data signal from interference (e.g., noise or a rogue data transmission). That is, the present optical and/or optoelectronic receiver can be used, for example, to distinguish a data signal from interference (e.g., noise or a rogue data transmission) and/or remove the interference from the data signal prior to the data signal being processed by circuitry downstream in the optical receiver. Such circuitry can minimize data processing errors and increase the processing efficiency of the optical receiver.

An Exemplary Method for Receiving a Signal

Figure 7:
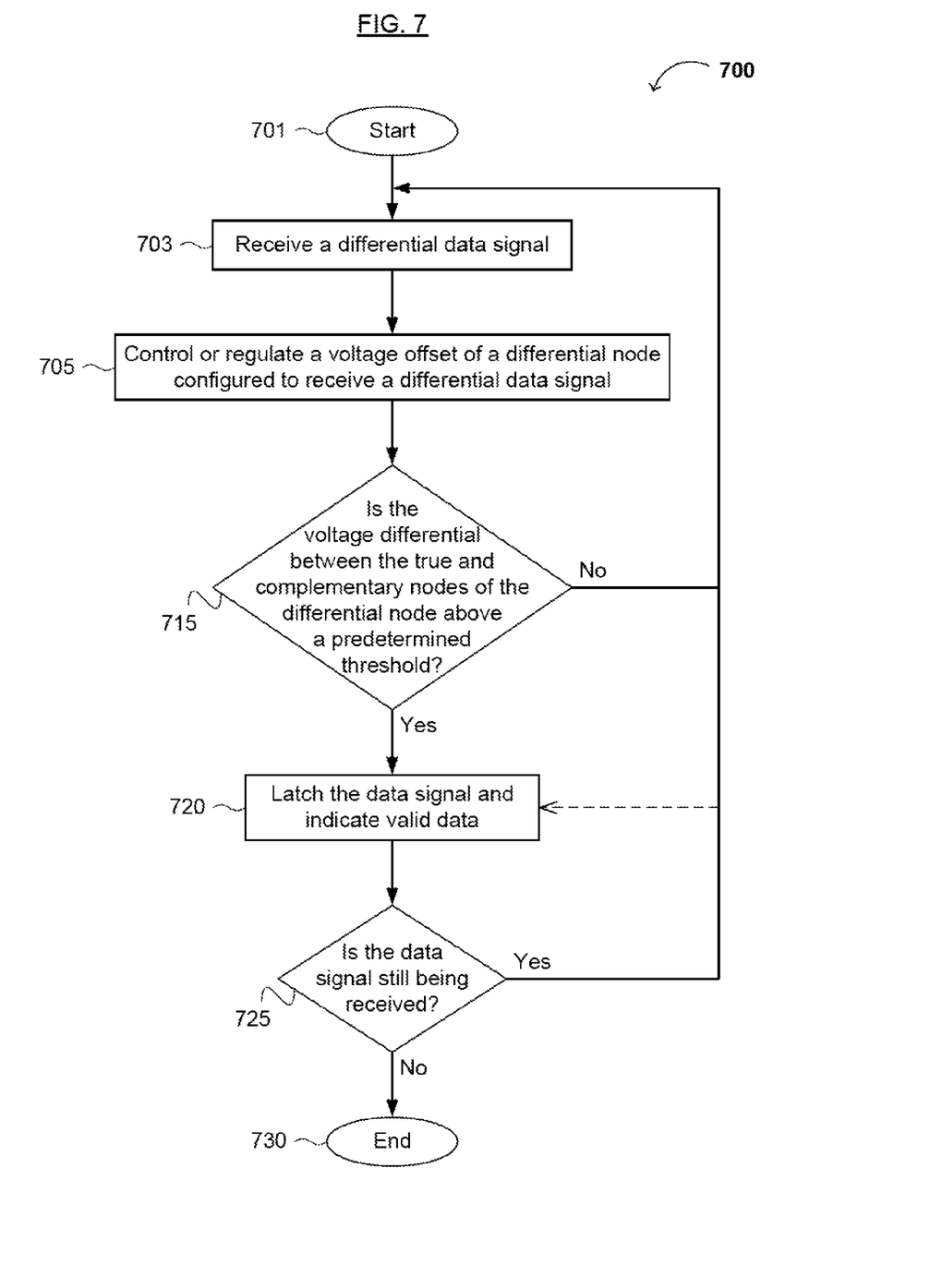
FIG. 7 is a flow chart showing an exemplary method for detecting a data signal according to the present invention.

FIG. 7 shows a flow chart 700 reflecting an exemplary method for receiving data signals in an optical or optoelectronic network (e.g., a "many-to-one" network such as a passive optical network, or PON) according to the present invention. As shown, at 701 the method begins, and at 703, a signal is received in an optical or optoelectronic receiver. Although a single-ended data signal is typically received by the receiver, the receiver may convert the single-ended signal to a differential signal. Thus, in some embodiments, a differential data signal is provided by optical receiver circuitry (e.g., an amplifier or buffer, such as amplifier 201 in FIG. 2). The differential data signal can be received by, e.g., a filter (e.g., filter circuit 203' or 203" in FIGS. 4-5) and/or a threshold controller/regulator (e.g., threshold control circuit 205' in FIG. 3).

At 705, the voltage offset of a differential node that is configured to receive, carry and/or transmit the data signal (e.g., the differential data signal) is controlled or regulated. Controlling or regulating the data signal may include applying a threshold voltage (e.g., $V_{TH}$) to the received and/or differential data signal, or adjusting (e.g., increasing or decreasing) the threshold voltage applied to the differential data signal node. The adjustment can be provided when, e.g., receipt of a first data/signal transmission has ended, and prior to a next (or sequential) data/signal transmission being received. Such control or regulation can be provided by a threshold control circuit (e.g., threshold control circuit 205 and 205' discussed above with regard to FIGS. 2-5), which may receive a voltage (e.g., $V_{TH}$) that controls, sets, or determines the voltage threshold at which valid data is detected. The voltage $V_{TH}$ may be provided by a circuit configured to determine or set a voltage threshold for the incoming differential signal (e.g., a peak detector). The voltage threshold can be adjusted by increasing or decreasing a voltage of the voltage source (not shown) that provides the threshold voltage to the threshold control circuit.

At 715, the method determines if the voltage differential between true and complementary nodes of the differential signal is at or above a predetermined voltage threshold. The voltage differential may be determined by a data detection/indication circuit (e.g., data detection/indication circuit 207 and/or 207' discussed above with regard to FIGS. 2-5) configured to latch the differential signal when the voltage differential between the true and complementary nodes is equal to or above the predetermined voltage threshold. The voltage threshold may be determined by a threshold control circuit (e.g., threshold controller/regulator 205 or 205' discussed above with regard to FIGS. 2-6). In one embodiment, the predetermined voltage threshold is set or determined by an external and/or secondary voltage source applied to the threshold control circuit. In further embodiments, the differential data signal is filtered (e.g., utilizing a filter such as filter 203, 203' or 203" of FIGS. 2-6) to reduce or remove interference (e.g., noise or rogue data transmissions). In one example, the filter counts the number of transitions of the differential signal during a predetermined time interval, compares the signal transition count with a predetermined number, and determines whether the signal transition count equals the predetermined number.

When the voltage differential is below the predetermined threshold, the method returns to 701. However, when the voltage differential is equal to or above the predetermined threshold, the method indicates that the differential signal is valid data at 720.

For example, in one embodiment, a signal (e.g., having a high binary logic state) indicative of the presence of valid data may be transmitted or generated at 720. In some embodiments, a data detection/indication circuit (e.g., data detection/indication circuit 207 or 207' of FIGS. 2-6) provides the signal indicative of valid data. In some embodiments, the signal is provided to circuitry external to the optical receiver or downstream from the optical receiver in an optical network (e.g., an external host such as host 640 in FIG. 6 in a PON).

At 725, the method determines if the data signal is (still) being received. For example, the method may determine that the signal is no longer being received when a signal or signal portion (such as a termination flag) indicative of the end of the data signal is received. That is, in some embodiments, logic settings (e.g., logic settings within a counter, a timer, etc.) can be programmed and/or determined by information in a memory (e.g., memory 530 in FIG. 6) that can indicate the beginning and end of various data signals (e.g., data blocks having a known or standard format, such as packets, frames, pages, etc.). In some cases, the data block may have a known length and known inter-signal spacing, or a known delay between adjacent data blocks. The data signal may no longer be received when, for example, an MCU determines that the duration of a data block having a known format and/or signal length has expired. While the data signal is being received (e.g., when an indication of the known end time has not been received), the method returns to 703 (or alternatively, to 720 [not shown]). When the method determines that the differential data signal is no longer being received (e.g., the data block end time has been indicated), the method proceeds to 730 and ends.

Thus, the present method is capable of quickly and accurately detecting and/or identifying a data signal (e.g., by utilizing the optical receiver circuitry discussed above with respect to FIGS. 1-6). For example, the present method can easily, quickly and effectively determine or distinguish valid data from interference (e.g., noise or a rogue data transmission) and/or remove interference from the data signal(s) before further processing is performed. The method can minimize data processing errors and increase the processing efficiency of the optical receiver.

CONCLUSION/SUMMARY

Thus, the present invention provides threshold setting and data detection circuitry and methods of detecting and/or indicating the presence of a data signal. The present invention advantageously provides fast and accurate data signal detection in optical and/or optoelectronic receivers and/or transceivers.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of detecting a differential data signal, the method comprising:
    a) amplifying a received signal to provide said differential data signal;
    b) controlling or regulating a voltage offset of a differential node configured to receive said differential data signal;
    c) latching or storing said controlled or regulated differential data signal;
    d) executing one or more commands to determine when a voltage differential between true and complementary nodes of said differential node is above a predetermined threshold; and
    e) when said voltage differential between said true and complementary nodes of said differential input signal is above said predetermined threshold, indicating a presence of said differential data signal.

2. The method of claim 1, further comprising filtering said differential data signal prior to regulating or controlling said differential data signal.

3. The method of claim 2, wherein filtering said differential data signal comprises passing said differential data signal through one or more RC, LC, or RLC circuits.

4. The method of claim 1, wherein regulating or controlling said voltage offset comprises applying a voltage differential across said differential node.

5. The method of claim 1, wherein said latching or storing said controlled or regulated differential data signal comprises sampling said differential data signal using a flip-flop.

6. The method of claim 1, further comprising processing or decoding said differential data signal after indicating said presence of said differential data signal.

7. A detection circuit, comprising:
    a) a first circuit configured to regulate or control a DC offset of a differential input signal, said differential input signal having true and complementary nodes, and said first circuit comprising:
        i. a first resistor electrically connected to a first power supply and one of said true and complementary nodes of said differential input signal;
        ii. a second resistor electrically connected between said true and complementary nodes; and
        iii. a third resistor electrically connected to a second power supply and the other of said true and complementary nodes; and
    b) a second circuit coupled to said first circuit, said second circuit configured to, when a voltage difference between true and complementary nodes of said differential input signal is above a predetermined threshold, indicate a presence of a data signal at said differential input signal.

8. The detection circuit of claim 7, further comprising a filter configured to receive said differential input signal and provide a filtered differential input signal to said first circuit.

9. The detection circuit of claim 8, wherein said filter comprises one or more RC, LC, or RLC circuits.

10. The detection circuit of claim 9, wherein each of said one or more RC, LC, or RLC circuits comprises a capacitor coupled in series to a resistor and/or an inductor.

11. The detection circuit of claim 10, wherein said one or more RC, LC, or RLC circuits comprises a first RLC circuit coupled to said true node of said differential input signal and a second RLC circuit coupled to said complementary node of said differential input signal.

12. The detection circuit of claim 7, wherein said second circuit comprises a flip-flop.

13. An optical receiver, comprising:
    a) the detection circuit of claim 7;
    b) an amplifier coupled to said detection circuit, wherein said amplifier is configured to provide said differential input signal.

14. The optical receiver of claim 13, further comprising a photodiode configured to convert an optical signal to an electrical signal to be processed by said amplifier.

15. A detection circuit, comprising a first circuit configured to regulate or control a DC offset of a differential input signal, and a second circuit coupled to said first circuit, wherein said second circuit is configured to, when a voltage difference between true and complementary nodes of said differential input signal is above a predetermined threshold, indicate a presence of a data signal at said differential input signal, and said second circuit comprises a timer configured to determine a time between consecutive transitions of said differential input signal after said differential input signal increases above said predetermined threshold.

16. The detection circuit of claim 15, wherein said first circuit comprises:
   a) a first resistor electrically connected to a first power supply and one of said true and complementary nodes of said differential input signal;
   b) a second resistor electrically connected between said true and complementary nodes; and
   c) a third resistor electrically connected to a second power supply and the other of said true and complementary nodes.

17. The detection circuit of claim 15, wherein said second circuit further comprises a counter configured to count a number of said consecutive transitions during a predetermined time interval.

18. The detection circuit of claim 17, wherein said second circuit further comprises logic configured to receive an output of said timer and an output of said counter, and provide said indication of a presence of said data signal.

19. An optical receiver, comprising a first circuit configured to regulate or control a DC offset of a differential input signal, a second circuit coupled to said first circuit and configured to, when a voltage difference between true and complementary nodes of said differential input signal is above a predetermined threshold, indicate a presence of a data signal at said differential input signal, an amplifier coupled to said detection circuit, wherein said amplifier is configured to provide said differential input signal, and a microprocessor or microcontroller configured to execute one or more commands to determine when said voltage differential between said true and complementary nodes of said differential input signal is above said predetermined threshold.

20. The optical receiver of claim 19, further comprising a memory in electrical communication with said microcontroller or microprocessor, and configured to store data related to said predetermined threshold.

* * * * *